Nov. 7, 1933.  C. E. ELLIOTT ET AL  1,933,621
FRUIT JUICE EXTRACTOR
Filed Nov. 6, 1929   2 Sheets-Sheet 1
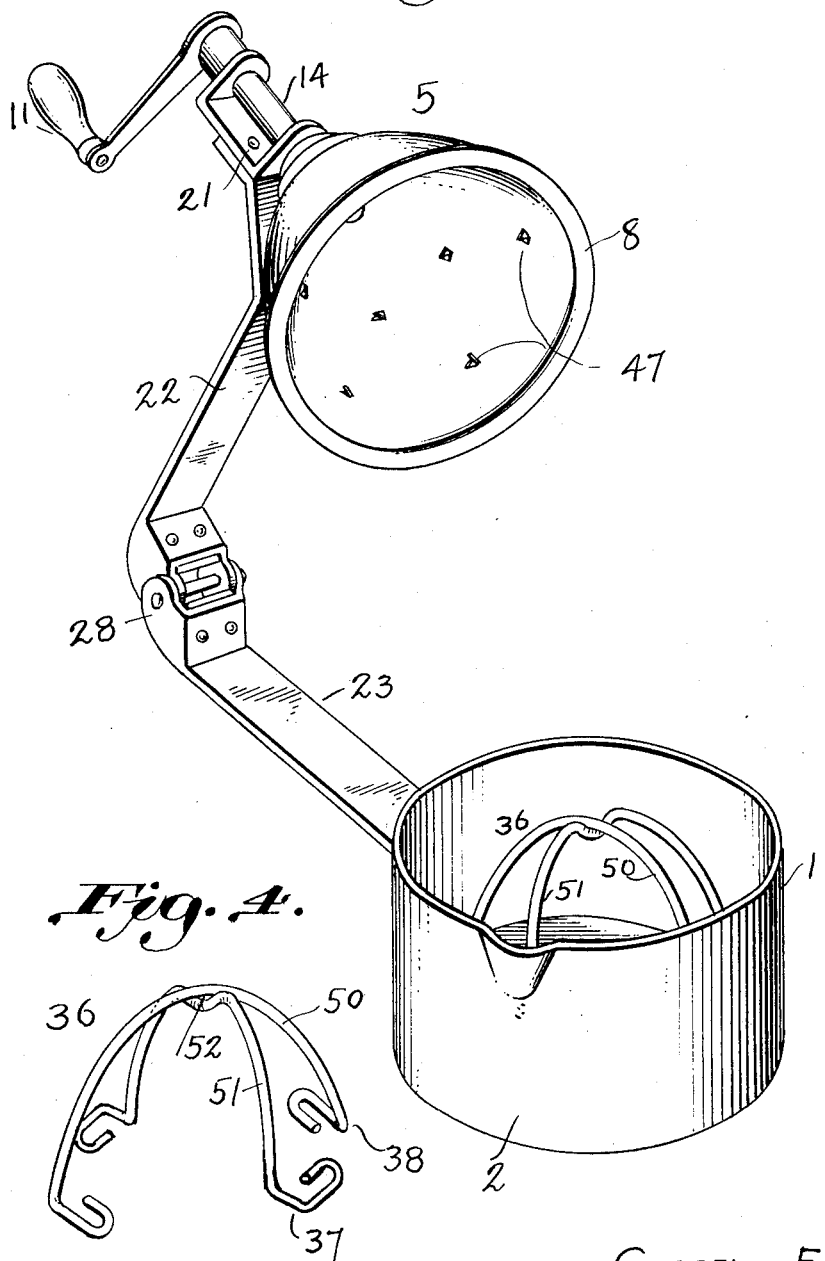
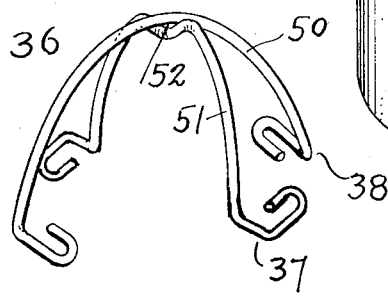
Inventors
CLARENCE E. ELLIOTT
AND LEONARD O. NICHOLS,
By Edward Williams, Attorney

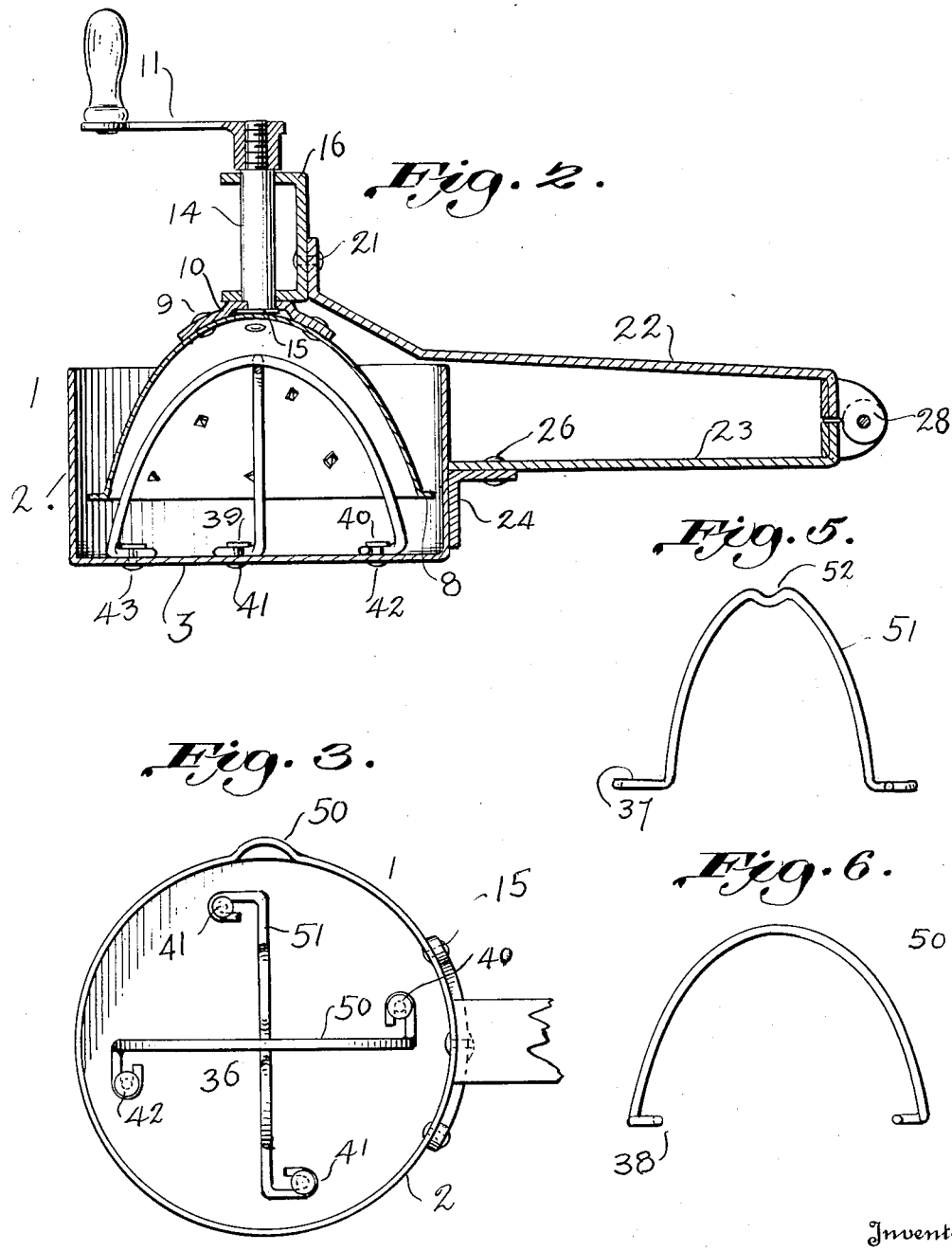

Patented Nov. 7, 1933

1,933,621

UNITED STATES PATENT OFFICE 1,933,621

FRUIT JUICE EXTRACTOR

Clarence E. Elliott and Leonard O. Nichols, Kansas City, Mo., assignors to Knapp Monarch Company, Inc., St. Louis, Mo., a corporation of Missouri Application November 6, 1929. Serial No. 405,207

7 Claims. (Cl. 146—3)

Our invention relates to improvements in fruit juice extractors of the type described in our application Serial No. 249,258 (filed January 25, 1928) and more particularly to a device for extracting the juices from citrus fruits such as oranges, lemons, and the like.

The principal object of our invention is to provide for the complete extraction of such juices with facility and extreme rapidity and also to separate the seeds and pulp therefrom to obtain the juice in its purest form.

Another object of our invention is to obtain the juice from the fruit by forming it over an extracting member which is greater along one diameter than it is along any other diameter.

A further object of our invention is to provide the juice extractor with an extracting member which is formed of wires one nesting in supporting relation to the other.

A still further object of our invention is to provide a means whereby the fruit may easily be supported over the extracting member at the beginning of the juice extracting operation.

Other objects and advantages will become apparent to those skilled in the art from a study of the drawings.

Fig. 1 is a perspective view of our invention illustrated in fruit receiving position.

Fig. 2 is a longitudinal vertical section through the same.

Fig. 3 is a plan view of the juice receiving receptacle showing the juice extracting means in plan.

Fig. 4 is a perspective view of the juice extracting members shown in working relationship and Figs. 5 and 6 are views taken along the respective axes of the member constituting the fruit juice extracting member.

Referring now to the drawings, 1 designates a juice receiving receptacle comprising a cup-shaped member formed of sheet metal having a cylindrical wall 2, and an integral flat bottom 3. In the side of the wall is formed a spout 50'. An impaling member 5 is also constructed of sheet metal having V-shaped tangs 47 instruck in the direction of forward rotation along the walls thereof. The walls of the impaling member terminate in a laterally projecting peripheral flange 8 of a diameter slightly smaller than the diameter of the juice receptacle. The impaling member is rotatably mounted by means of the shaft 14 which is secured to the impaling member 5 as at 15 (Fig. 2) and which is also supported by a shouldered member 10 which is secured to the member 5 by the rivets 9. A handle 11 is adapted to be screwed onto the end of the shaft 14. The unit described is supported by a yoke member 16 which is secured to arm 22 by rivets 21.

The arm 22 is connected to the arm 23 through a hinge member 28. The arm 23 is secured to the juice receiving cup 1 by the rivets 26 and member 24 which is riveted to the cup 1 by rivets 15'. Within the cup is located the juice extracting member 36 which consists of two wires 50 and 51; the wire 50 is elliptical in form or substantially the shape of the vertical cross section of the fruit impaling member 5. The wire 51 is also semi-elliptical in form but of less diameter across the base than is the wire 50. It serves to reinforce and to make more substantial the wire 50 and assists in supporting the fruit until the impaling member through its tangs engages the fruit. It is formed so that the wire 50 may nest within the depression or recess 52. (Fig. 5.) These members have laterally bent hook shaped ends 37 and 38 for engaging the heads 39 and 40 of pins 41 and 42. These pins are secured to the bottom of the juice receptacle so that the wire forms may be readily detached therefrom by a slight rotary movement for cleaning purposes. The pins are provided with shoulder extensions 43 which project through the receptacle and are riveted to its under side to firmly retain the rivets in position for removably retaining the wire forms 50 and 51.

In operating our improved juice extractor the fruit is cut into two parts. One part is placed upon the extracting member 36 with sufficient force to break down a few juice carrying cells so that it will stay in place over the top of the extractor. It is to be noted that if the fruit should slip from the top of the extracting member it will not drop into the juice cup due to the proportioning of these members. The impaling member 5 is then lowered until the tangs 47 come into engagement with the rind of the fruit. The arms 22 and 23 may be grasped with the left hand while the right hand turns the handle 45 rotating the fruit over the extracting members. It may at once be seen that as the fruit cells are broken down the fruit assumes an ellipsoidal form; that the fruit is deformed along the axis of the member 50 which it will be recalled is of a larger diameter than the exposed portion of the fruit. The fruit is progressively deformed. The shape of the fruit is changed. The skin and juice carrying cells are stretched over the extracting member and the fruit is flattened somewhat. As the fruit is being rotated new cells are brought into engagement with the extracting member and the tangs 47, being distributed along the walls of the cup 5 maintain operative engagement with the fruit. It is to be particularly noted that it is by this peculiar deformation that the juicing of fruits is made easy and highly efficient. When the juice extracting operation is completed the arm 22 will strike the rim of the cup 1 and further relative movement between the impaling member and cup will be prevented. The juice extractor is then tilted with the impaling member still urged over the extracting member and the juice poured out of the spout 50'. The rim 8 as has been pointed out closely fits within the cup and serves to retain the seeds and pulp so that the juice from the fruit is thereby obtained substantially free from seeds and pulp.

Cleaning is easily effected since as we have pointed out the members 50 and 51 are removably secured in the cup 1, and the carrying member 5 is also removably secured to the arm 22 and yoke 16.

It will be apparent to those skilled in the art that various modifications of our invention may be constructed without departing from the spirit and scope of our invention and it is to be understood that we are not to be limited in any way to the exact disclosure described and what we believe to be new and novel we will now point out more particularly in the appended claims.

We claim:

1. As an article of manufacture, a fruit juice extractor consisting of a base having mounted thereon two downwardly divergent wire loops of substantially equal height, one of said loops being of greater horizontal dimension than the second.

2. An article of manufacture, a fruit juice extractor consisting of a base having mounted thereon a pair only of single downwardly divergent wire loops whose apices intersect in substantially a common horizontal plane.

3. In a fruit juice extractor the combination of a juice receiving cup, a juice extractor mounted therein comprising two semi-elliptical members in supporting relation to each other, the inner member having a recess at its apex within which the outer member rests, an arm with one end secured to said cup, a second arm hingedly connected to the other end of said first arm, a fruit impaling member rotatively supported by the other end of said second arm, the said arms providing for the hand application of pressure between said impaling member and said juice extracting member by the gripping of said arms intermediate of their ends.

4. As an article of manufacture, a fruit juice extractor comprising a base, semi-elliptical wire loops of uniform height having their free ends mounted on said base, the said loops intersecting one another at their apexes, and one of said loops being bent to form a recess at its apex for receiving the other loop.

5. As an article of manufacture, a fruit juice extractor comprising a base, inner and outer semi-elliptical wire loops of uniform height having their free ends mounted on said base, the said loops intersecting one another at their apexes, one of said loops being bent to form a recess at its apex for receiving the other loop, and one of said loops being smaller horizontally than the other loop.

6. As an article of manufacture, a fruit juice extractor consisting of a base having mounted thereon two only downwardly divergent members of substantially equal height, one of said members being of greater horizontal dimension than the second one and both of them having blunt fruit engaging surfaces.

7. In an article of manufacture, a fruit juice extractor consisting of a base having mounted thereon a pair only of downwardly divergent elliptical members in supporting relation to each other and arranged in planes extending at substantially right angles to each other, the apices of said members intersecting in substantially a common horizontal plane and the fruit engaging surfaces thereof being substantially blunt to prevent cutting of the fibre of the fruit between the juice carrying cells thereof.

CLARENCE E. ELLIOTT.
LEONARD O. NICHOLS.